(12) United States Patent
Rosen

(10) Patent No.: US 9,750,202 B2
(45) Date of Patent: *Sep. 5, 2017

(54) PROCESSES AND APPARATUS FOR REDUCING THE INTENSITY OF TROPICAL CYCLONES

(75) Inventor: Alfred Rosen, Palm Beach, FL (US)

(73) Assignees: Robert M. Rosen, Edwards, CO (US); David B. Rosen, Lexington, MA (US)

(*) Notice: Subject to any disclaimer, the term of this patent is extended or adjusted under 35 U.S.C. 154(b) by 1419 days.

This patent is subject to a terminal disclaimer.

(21) Appl. No.: 13/323,999

(22) Filed: Dec. 13, 2011

(65) Prior Publication Data

US 2012/0138700 A1   Jun. 7, 2012

Related U.S. Application Data

(63) Continuation-in-part of application No. 12/141,161, filed on Jun. 18, 2008, now Pat. No. 8,161,757.

(Continued)

(51) Int. Cl.
*A01G 15/00* (2006.01)
*B05B 12/12* (2006.01)
(Continued)

(52) U.S. Cl.
CPC .............. *A01G 15/00* (2013.01); *B05B 12/12* (2013.01); *B05B 17/04* (2013.01); *B63B 25/08* (2013.01); *B63B 35/44* (2013.01); *F25C 3/04* (2013.01)

(58) Field of Classification Search
CPC  A01G 15/00; F25C 3/04; B05B 12/00; B05B 12/12; B05B 12/18; B05B 17/00; B05B 17/04; B63B 25/08; B63B 35/44; B63B 35/4413; B63B 2211/00; B63B 2213/02
(Continued)

(56) References Cited

U.S. PATENT DOCUMENTS

| 2,698,431 A | 12/1954 | Bielinski |
| 2,903,188 A | 9/1959 | Hutchinson |

(Continued)

FOREIGN PATENT DOCUMENTS

| JP | 11-171094 | 6/1999 | ........... B63H 11/107 |
| WO | WO 2006/085830 | 8/2006 | ............. A01G 15/00 |

OTHER PUBLICATIONS

East Derwent Abstract of JP-11-171094, downloaded on Dec. 2, 2011.

(Continued)

*Primary Examiner* — Joseph Drodge
(74) *Attorney, Agent, or Firm* — Nixon Peabody LLP

(57) ABSTRACT

A navigable vessel for use in reducing the intensity of a tropical cyclone having an eye located over an ocean comprises a plurality of artificial snow-making devices aboard the vessel, at least one pump coupled to the devices and accessible to a body of water in which the vessel is floating for supplying the devices with water for making artificial snow, and a power source coupled to the devices to operate the devices in concert for producing a substantially uninterrupted supply of artificial snow. The artificial snow-making devices have discharge nozzles oriented to project the artificial snow away from the vessel onto or above the water adjacent the vessel.

7 Claims, 4 Drawing Sheets

Related U.S. Application Data

(60) Provisional application No. 60/958,777, filed on Jul. 9, 2007.

(51) Int. Cl.
B05B 17/04 (2006.01)
B63B 25/08 (2006.01)
B63B 35/44 (2006.01)
F25C 3/04 (2006.01)

(58) Field of Classification Search
USPC ........ 60/641.6, 641.7; 210/138, 170.11, 747; 239/2.1, 2.2, 14.1, 14.2; 114/144 A, 114/144 R, 244, 264–267, 382; 440/1, 2, 440/8–10; 441/1–3; 405/130, 195.1, 405/217; 62/74, 300–303, 240
See application file for complete search history.

(56) References Cited

U.S. PATENT DOCUMENTS

| | | | |
|---|---|---|---|
| 2,927,435 A | 3/1960 | Upson | |
| 3,762,176 A | 10/1973 | Coggins, Jr. | |
| 4,356,094 A | 10/1982 | Ross | |
| 4,399,040 A | 8/1983 | Ayers et al. | |
| 4,523,879 A | 6/1985 | Finucane et al. | |
| 4,699,545 A | 10/1987 | Chen et al. | |
| 4,813,598 A | 3/1989 | Kosik, Sr. et al. | |
| 5,035,541 A | 7/1991 | Gulati et al. | |
| 5,173,182 A | 12/1992 | Debellian | |
| 5,556,029 A | 9/1996 | Griese | |
| 5,753,108 A | 5/1998 | Haynes et al. | |
| 6,315,213 B1 | 11/2001 | Cordani | |
| 6,684,648 B2 | 2/2004 | Faqih | |
| 6,845,919 B1 | 1/2005 | Hogue | |
| 7,536,967 B2 | 5/2009 | Barber | |
| 8,161,757 B2 * | 4/2012 | Rosen | A01G 15/00 114/264 |
| 8,262,314 B2 * | 9/2012 | Sirovich | 405/52 |
| 2002/0008155 A1 | 1/2002 | Uram | |
| 2003/0085296 A1 | 5/2003 | Waxmanski | |
| 2003/0173414 A1 | 9/2003 | Herpay | |
| 2005/0031417 A1 | 2/2005 | Hofer | |
| 2005/0133612 A1 | 6/2005 | Uram | |
| 2006/0018719 A1 | 1/2006 | Stern | |
| 2007/0084768 A1* | 4/2007 | Barber | 210/143 |
| 2007/0114298 A1 | 5/2007 | O'Keefe | |
| 2007/0158449 A1 | 7/2007 | Hoffmann et al. | |
| 2007/0158452 A1* | 7/2007 | Hofffmann et al. | 239/14.1 |
| 2007/0257126 A1 | 11/2007 | Vondracek | |
| 2007/0270057 A1 | 11/2007 | Feldman et al. | |
| 2007/0283866 A1* | 12/2007 | Veazey | B63B 3/04 114/77 R |
| 2008/0035750 A1* | 2/2008 | Aylor | 239/2.1 |
| 2008/0158448 A1* | 7/2008 | Fernando et al. | 349/16 |
| 2008/0175669 A1 | 7/2008 | Kleysen | |
| 2008/0175728 A1 | 7/2008 | Kithil | |
| 2008/0277492 A1 | 11/2008 | Cannon | |
| 2009/0008468 A1 | 1/2009 | Skukan | |
| 2009/0028776 A1 | 1/2009 | Osegovic et al. | |
| 2009/0173386 A1 | 7/2009 | Bowers et al. | |
| 2009/0173404 A1 | 7/2009 | Bowers et al. | |
| 2009/0173801 A1 | 7/2009 | Bowers et al. | |
| 2009/0175685 A1 | 7/2009 | Bowers et al. | |
| 2009/0177569 A1 | 7/2009 | Bowers et al. | |
| 2009/0272817 A1* | 11/2009 | Blum et al. | 239/2.1 |
| 2011/0101124 A1* | 5/2011 | Roberts | A01G 15/00 239/14.1 |
| 2011/0168797 A1* | 7/2011 | Neymeyer | A01G 15/00 239/2.1 |
| 2011/0204159 A1* | 8/2011 | Rogers | B64G 1/428 239/14.1 |
| 2011/0284649 A1* | 11/2011 | Crawford | A01G 15/00 239/2.1 |

OTHER PUBLICATIONS

Thesis by William Chapman, Captain, USAF, "Developing Prediction Regions for a Time Series Model for Hurricane Forecasting", Thesis presented to the Faculty of the Graduate School of Engineering of the Air Force Institute of Technology Approved for public release, Dec. 1993, downloaded from the internet Sep. 9, 2011.

Pelc et al., "Renewable Energy From the Ocean," Marine Policy vol. 26, 2002, 9 pages.

Salicido, "Offshore Federalism and Ocean Industrialization," 82 Tulane Law Review, 2007-2008, 4 pages.

* cited by examiner (7 Ships)

(15 Ships)

(7 Ships-Rotated)

(21 Ships)

PROCESSES AND APPARATUS FOR REDUCING THE INTENSITY OF TROPICAL CYCLONES

CROSS REFERENCE TO RELATED APPLICATIONS

This application is a continuation-in-part of U.S. application Ser. No. 12/141,161, filed Jun. 18, 2008, and claims priority to U.S. Provisional Application No. 60/958,777 filed Jul. 9, 2007.

BACKGROUND OF THE INVENTION

This invention teaches to use artificial snow to suppress moisture rising from warm surface water into storm clouds that are capable of producing tropical cyclones, aided if desired by the use of subsurface water to lower the temperature of surface water below the temperature that favors the production of tropical cyclones. Embodiments of the invention are disclosed in the drawings that accompany this application and the description of those drawings that follows. Ships that facilitate the use, maintenance and uninterrupted operation of snow-making and water delivery equipment under storm-at-sea conditions are disclosed. Deployment schemes for using multiple ships under local or remote control are also disclosed.

This invention responds to a long-felt want that is arguably the longest such want in recent history. The east coast of Florida is littered with Spanish ships bound for Spain loaded with treasures stolen from the native inhabitants of Central and South America, that never made it; wooden ships driven by sail were no match for the hurricanes they encountered. To this day that situation has not improved; indeed it has gotten worse with increased population, and more recently oil drilling in the Gulf of Mexico. The losses of life and property only get greater with each severe hurricane, and severe hurricanes are increasing in frequency. Yet, in spite of many attempts to conquer the hurricanes, the results have been consistent failure. Many reasons have been advanced for the failures, principal among them the vastness of these storms, and the great cost of attacking them. This application proposes a solution that can be executed using known technologies realized in available components and a novel method of operation that maximizes the opportunity to succeed.

A tropical cyclone's energy source is the release of the heat of condensation from water vapor condensing, with solar heating being the initial source for evaporation. Tropical cyclones form when the energy released by the condensation of moisture in rising air causes a positive feedback loop over warm ocean waters. The present invention provides a process for slowing, hopefully breaking, that loop more efficiently than has heretofore been known. It is a general property of the positive feedback loop that it will increase in strength until some external force appears to slow it or stop it. A common example is the audio amplifier system which will break into a loud scream if the output device (loudspeaker) can communicate with the input device (microphone); simply putting a hand over the microphone stops it cold. This property has been recognized in tropical cyclones. Condensation leads to higher wind speeds, as a tiny fraction of the released energy is converted to mechanical energy. The faster winds and lower pressure associated with them in turn cause increased surface evaporation and thus even more condensation. Much of the released energy drives updrafts that increase the height of the storm clouds, speeding up condensation. This positive feedback loop, called the wind-induced heat exchange, continues for as long as conditions are favorable for tropical cyclone development.

Project "Storm Fury" is widely reported as the last (1960-70, approx.) government attempt to modify hurricanes. The process used was to seed selected storms with silver iodide, from the air. It was, in Applicant's terms, a "batch" process. In one attempt the winds of Hurricane Debbie are reported to have dropped as much as 30 percent, but then regained their strength after each of two seeding forays. That frustrating defect remained virtually unaddressed for the better part of half a century, until Applicant's parent application.

It is another property of the "eye" that it is an area of comparatively light winds and fair weather, found at the center of a severe tropical cyclone. The Louisiana Governor's Office of Homeland Security and Emergency Preparedness (GOHSEP) has issued a bulletin titled "*FACTS ABOUT THE EYE OF A HURRICANE.*" Its first three sentences are: "The 'eye' is a roughly circular area of comparatively light winds and fair weather found at the center of a severe tropical cyclone. Although the winds are calm at the axis of rotation, strong winds may extend well into the eye. There is little or no precipitation and sometimes blue sky or stars can be seen."

SUMMARY OF THE INVENTION

In illustrated embodiments, a navigable vessel for use in reducing the intensity of a tropical cyclone having an eye located over an ocean comprises a plurality of artificial snow-making devices aboard the vessel, at least one pump coupled to the devices and accessible to a body of water in which the vessel is floating for supplying the devices with water for making artificial snow, and a power source coupled to the devices to operate the devices in concert for producing a substantially uninterrupted supply of artificial snow. The artificial snow making devices have discharge nozzles oriented to project the artificial snow away from the vessel onto or above the water adjacent the vessel. In further illustrated implementations, multiple vessels equipped with artificial snow making devices are positioned in a region of the ocean directly beneath the eye, and multiple streams of artificial snow are directed onto or above the ocean water located directly beneath the eye of the cyclone.

In another embodiment, the intensity of a tropical cyclone having an eye located over an ocean with water vapor formed above the ocean water located directly beneath the eye is reduced by producing at least one stream of artificial snow and directing said stream into the water vapor above the ocean water located directly beneath the eye. In one implementation, multiple streams of artificial snow are directed onto or above the ocean water located directly beneath the eye of the cyclone.

BRIEF DESCRIPTION OF THE DRAWINGS

The invention will be better understood from the following description of preferred embodiments together with reference to the accompanying drawings, in which.

DETAILED DESCRIPTION OF ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 1:
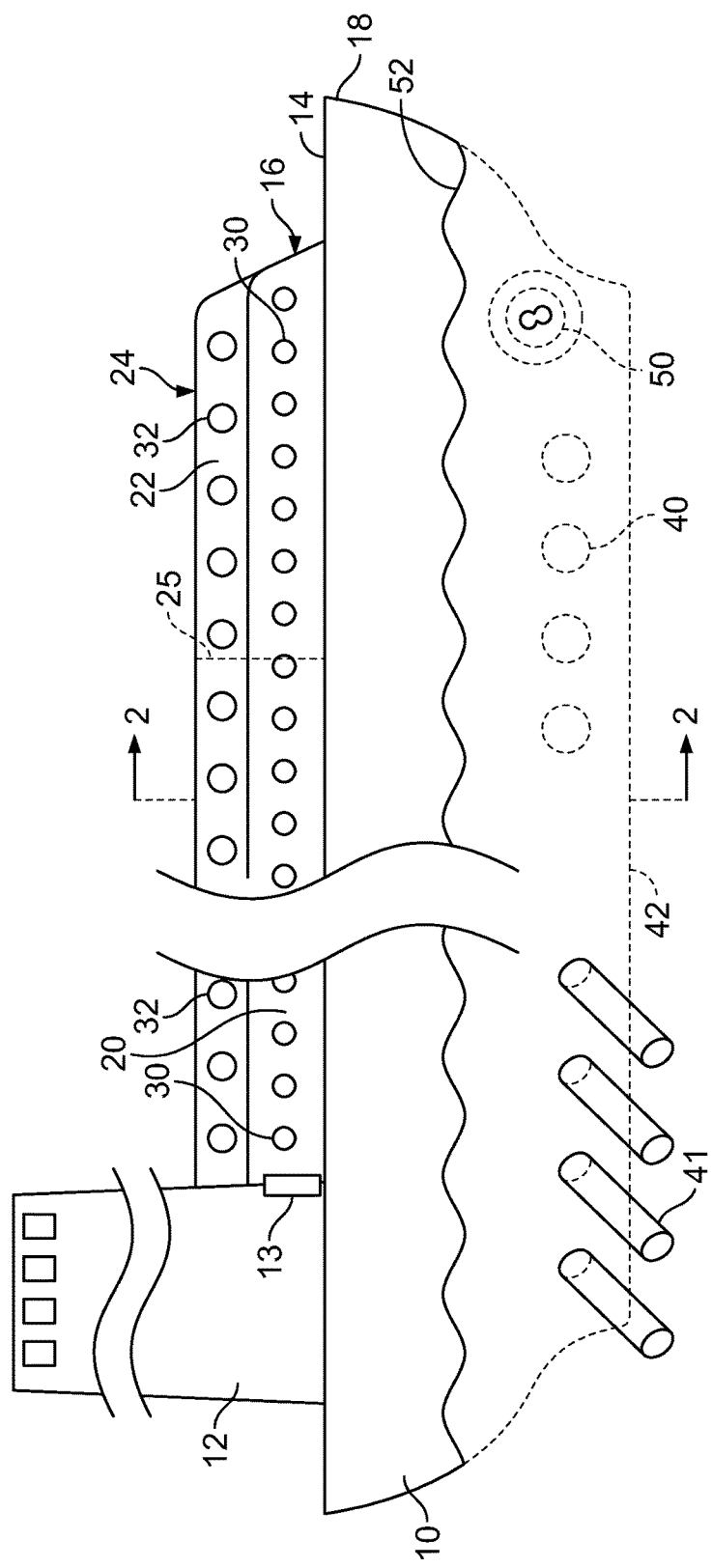
FIG. 1 is a side view of a ship designed to practice the invention.
Figure 2:
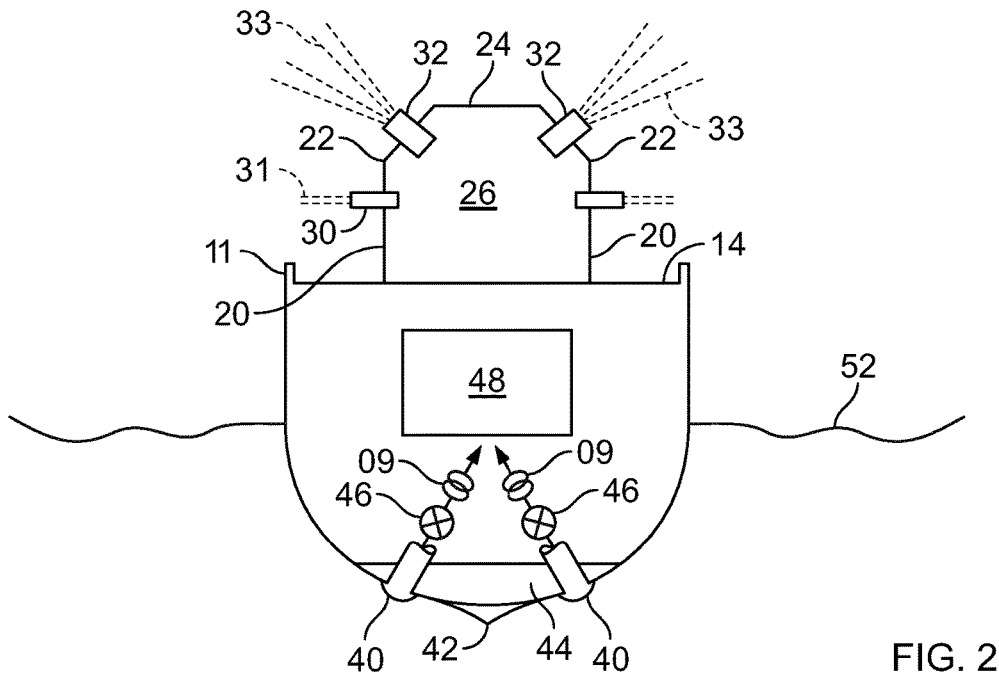
FIG. 2 is a section on line 2-2 in FIG. 1.

In FIGS. 1 and 2 the ship has a hull 10 resembling that of a typical oil tanker, with the bridge, navigation and living spaces in a tower 12 located aft. The main deck 14 supports a superstructure 16 extending from the tower forward toward the bow 18. As seen best in FIG. 2 the superstructure 16 has sidewalls 20 extending substantially vertically from the main deck, followed by inwardly-sloping walls 22 extending upwardly, capped by a substantially horizontal roof wall 24 completing an enclosure for interior space 26. Water nozzles are fixed in and extend through the sidewalls 20 in an array extending the full length of each sidewall. Snow makers 32 are fixed in and extend through the sloping walls 22 in an array of closely spaced devices extending the full length of each sloping wall. Screened water intakes 40 are fitted in the hull underwater on either side of the keel 42 and extending through the double-bottom 44. Each water intake is fitted with a control valve 46 and a water pump 09. Water intakes 40 extend in arrays along the forward portion of the hull on each side of the keel 42. Water outlets 41 extend along the aft portion of the hull on each side of the keel. Refrigeration equipment 48 is contained within the hull below the main deck 14. A transverse thruster 50 is fitted through the hull below the water line 52. In FIG. 2 a typical snow-maker pattern 33 is shown at each snow maker 32, and a typical water stream pattern 31 is shown at each water nozzle 30. The water nozzles 30 are located in the sidewalls 20 at a level that is above the main deck rails 11, so that the water streams will clear the rails.

Figure 3:
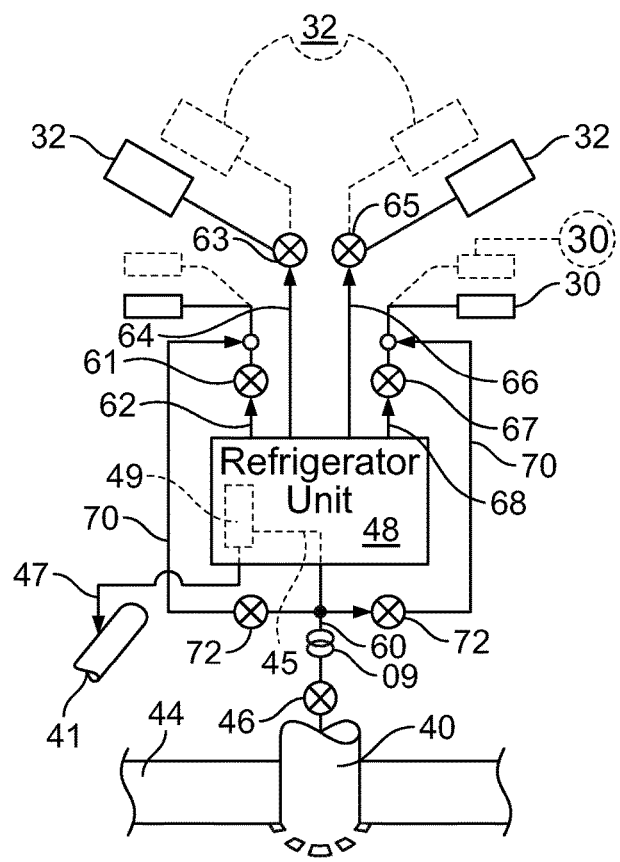
FIG. 3 is an operational schematic showing suggested connections among the elements shown in FIGS. 1 and 2.

In FIG. 3 a line 60 extends from the control valve 46 to the refrigerator unit 48. Four output lines 62, 64, 66 and 68 extend from the refrigerator unit to each of the water nozzles 30 and the snow makers 32, individually. Each output line is fitted with a control valve 61, 63, 65 and 67, respectively. As thus far described the system will provide refrigerated water to all of the water nozzles and snow makers on the ship. There may be several refrigerator units, and each unit may service several snow makers 32 and water nozzles 30, as is suggested in FIG. 3. If desired, the water nozzles 30 may be fed water directly from the water intakes 40 via by-pass lines 70. The bypass lines connect to the line 60 from the control valve 46 through valves 72, respectively. To use the bypass lines 70 valves 72 are opened and valves 61, 67 are closed.

Each refrigerator unit 48 includes a heat exchanger 49. Within the unit 48 some of the intake water is diverted via a line 45 to the heat exchanger and through the heat exchanger to an outlet 41, for removing accumulated heat from the refrigerator unit. The outlets 41 are directed aft and downward to direct the heated water downward toward colder regions of the ocean water behind the ship.

In the process of making artificial snow the snow makers 32 extract latent heat of fusion from the water that is supplied to them. The artificial snow, in turn, extracts heat from the moisture into which it is sprayed by the snow makers. The heat that would otherwise be available to support cyclonic action is thereby diminished. Since snow makers as heretofore used are operated in a cold environment the invention provides water to the snow makers 32 that is refrigerated to a temperature low enough for the snow makers to produce artificial snow. On the other hand, since the surface-water temperature must exceed a known value in order that a cyclone may evolve, it may not be necessary to refrigerate the water that is sprayed on the surface to inhibit formation of a cyclone. The invention provides an option to refrigerate or not refrigerate that water.

Although it is not intended to limit this invention to any specific theory of operation, it is believed to be likely that initially, when the coolant (artificial snow) is sprayed into the water vapor it will lower the temperature and with it the vapor pressure at a cost not exceeding one calorie per gram (assuming that the water vapor will have a specific heat not greater than that of liquid water), and that cooling of the water vapor will proceed toward the freezing point, where the vapor pressure will approach a vanishing value. This alone will deprive the cyclone of the driving force which it would otherwise derive from an uninterrupted rising volume of warm water vapor that condenses in the upper atmosphere. The aforementioned wind-induced heat exchange (positive feedback loop) will be suppressed. To keep it suppressed, which has not heretofore been achieved, this invention produces substantially uninterrupted streams of coolant in particulate form and directs those streams onto or above the surrounding ocean surfaces, and can increase the volume of those streams until the desired result is achieved.

To gain maximum effectiveness the ship 10 must hold station in the eye of a cyclone. This requirement limits the speed of advance to the speed at which the storm is advancing, which may be a very low speed. It is difficult for ships to maintain a desired heading when advancing at very low speeds because the rudder loses control at very low speeds. The bow thruster 50 is useful to compensate for this loss of control. The ship 10 thereby maintains a position that is fixed with relation to the eye, for days if necessary as the storm advances, so that it proceeds on the same path as the cyclone while continually dispensing onto or above the surrounding ocean surfaces an uninterrupted stream of a coolant (artificial snow), which it generates from the water in which the ship floats.

The interior space 26 within the superstructure 16 provides a gallery in which the water feed lines and valves shown in FIG. 3 can be supported, along with all necessary electrical and other support systems. The systems may include the electric motors and compressed air facilities that are normally supplied with snow making nozzles. Crewmembers who operate and maintain the equipment can be stationed in this gallery, safe from external hostile weather elements. A watertight door 13 is provided between the tower 12 and the gallery space 26, giving crewmembers access to the gallery that does not require going out of protected space. The enclosed gallery space 26 allows service pipes and electrical conductors to be passed through the main deck 14 within the enclosed space; there is no need to perforate the main deck outside of that space. Watertight integrity can be enhanced by providing one or more bulkheads 25 across the gallery space; such bulkheads, if provided, will include watertight doors (not shown).

As used herein, the term 'artificial snow' includes any solid form of water regardless of whether it is an ice crystal or an ice particle and regardless of whether it is in the form of single crystals or particles or an agglomeration of multiple crystals or particles.

Figure 4:
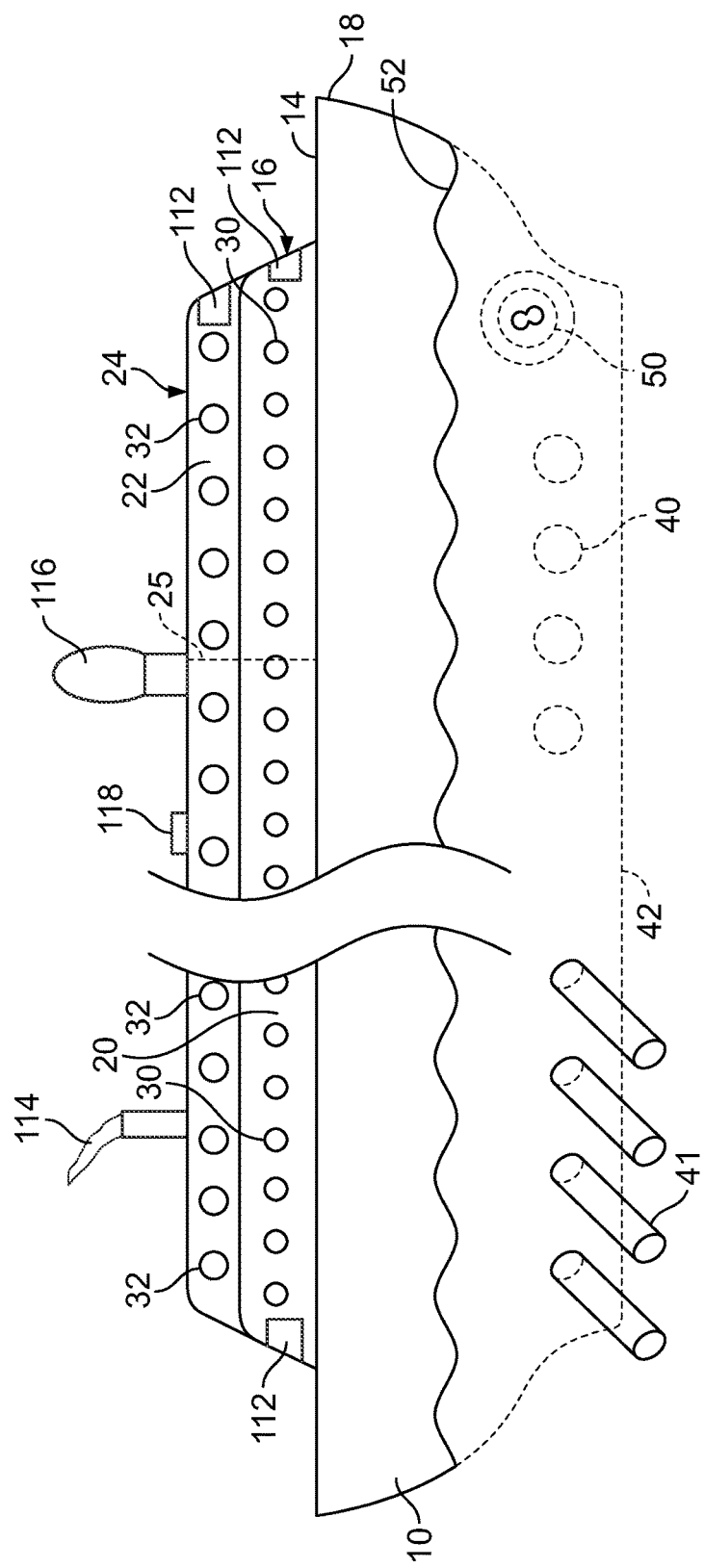
FIG. 4 is a side view of another ship designed to practice the invention.

It is contemplated that in use a plurality of ships will be deployed in the water beneath the cyclonic eye to cooperate in the effort to deprive the cyclone of its driving force. To this end FIG. 4 shows a ship 110 designed for remote control. This ship 110 differs from the ship 10 shown in FIGS. 1-3 in the following respects; the tower 12 is removed and the superstructure 16 and gallery space 26 extend to the stern; windows 112 are provided in both ends of the superstructure so that the ship may be conned from either end in an emergency or as may be needed in some circumstances; and antennae 114 and 116 of a type or types needed for remote control communication are added. In all other respects the ship 110 may be similar to the ship 10. An access hatch 118 is provided in the roof wall 24.

FIGS. 5a-5d illustrates a few exemplary configurations in which multiple ships may be deployed. For convenience the illustrated configurations are assemblies of equilateral triangles, the length of the sides of which represent the line-of-sight distance between two ships. The arrow 128 represents the direction of advance of the cyclone.

Figure 5A:
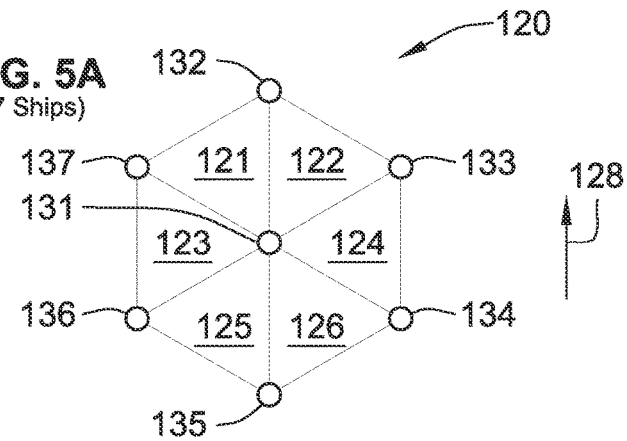
FIGS. 5a-5d illustrates a variety of deployment configurations for multiple vessels.

FIG. 5a shows a hexagonal configuration 120 of six triangles 121 to 126, inclusive, that represents a deployment of seven ships at the junctions 131 to 137, respectively, of the lines defining the triangle boundaries. These lines are equal in length and, as is mentioned above, their length represents the distance between two ships. The length of each said line should not exceed the line-of-sight distance between the respective antennae 114 or 116 of the two ships located at its ends if radio or radar communication between those two ships will be relied on to supervise the distance between them.

For the purposes of the present illustration, the hexagonal configuration 120 may be considered to be a basic deployment configuration, in which the seven ships that are members of it may be interrelated in one of several patterns. In one pattern the ship located at the first (central) junction 131 is ship 10 of FIG. 1 and will function as the master control ship for the remaining six ships, which will be drones according to ship 110 in FIG. 4. In another pattern all seven ships will be drones under control of a remote master station (not shown). These patterns are exemplary only.

Figure 5B:
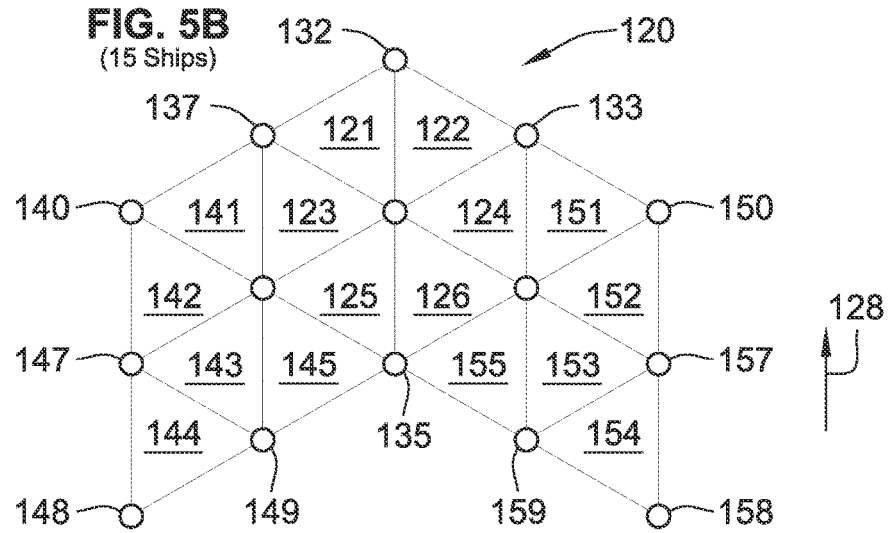

In FIG. 5b the basic deployment configuration 120 is augmented by the addition of five triangles 141 to 145, inclusive, at one side and the addition of another five triangles 151 to 155, inclusive, at the other side. New ship location junctions 146 to 149, inclusive, and 156 to 159, inclusive, are thereby added to yield a wing-shaped deployment configuration 160 in FIG. 5b, for a total of fifteen ships deployable in this configuration.

Figure 5C:
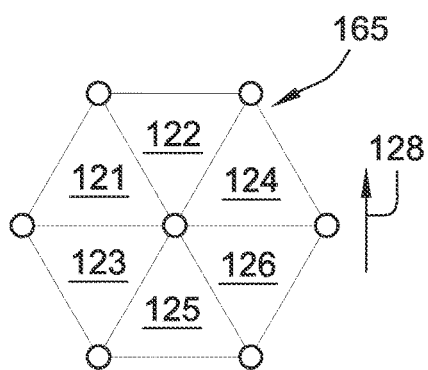
Figure 5D:
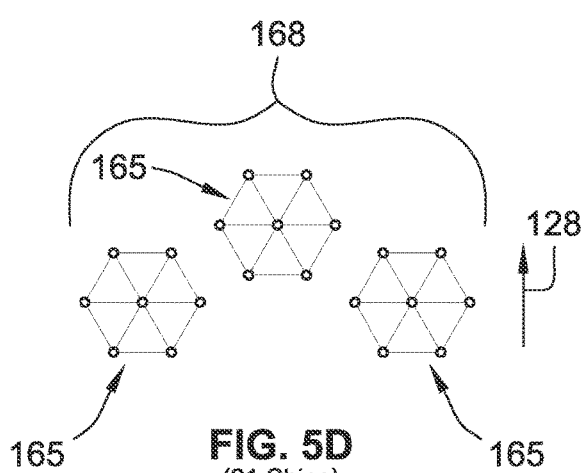

FIG. 5c shows a hexagonal configuration 165 like configuration 120, rotated one-quarter turn from the position shown in FIG. 5a. It is slightly wider in the direction transverse to the arrow 128. FIG. 5d shows a deployment of three configurations 165 spaced apart in a wing-shaped configuration 168 in which twenty-one ships are deployable.

Ships according to this invention can be fitted with one hundred or more coolant supply devices. Snow making devices and water nozzles are shown in the drawings, in closely spaced arrays on both sides of the ships 10 and 110. They can all be snow making devices, in quantities exceeding 100 in each ship. FIGS. 5a-5d illustrate deployment configurations of ships numbering up to twenty-one, but this number is for illustration only; it is not limiting. A modest number of twenty ships, each bearing one hundred snow making devices all working at the same time, uninterrupted over a time interval of several days while proceeding in the direction 128 on station under the eye of a tropical cyclone, would provide 2,000 snow making devices working in concert continually according to the invention to diminish the moisture rising from the ocean into the eye. There is no physical limit to how high the invention can be scaled.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A method of reducing the intensity of a tropical cyclone having an eye moving in a path over an ocean, said method comprising providing multiple navigable vessels each of which is equipped with artificial snow-making devices capable of producing streams of artificial snow, positioning each of said vessels in a unique location on said ocean directly beneath said eye and moving in said path therewith, operating said vessels so that each one maintains its unique location relative to said eye while moving with said eye in said path, and while maintaining said vessels in said respective unique locations continually producing said streams of artificial snow and directing said streams onto or above the ocean water directly beneath said eye.

2. A method of suppressing the wind-induced heat exchange of a tropical cyclone that is moving over an ocean toward a landfall and has an eye moving over said ocean, said method comprising taking up and maintaining a station moving on the ocean surface in said eye, said station thereby moving toward said landfall in the same path and at the same speed as said cyclone, and continually while in said station producing a substantially uninterrupted stream of coolant in particulate form and directing said coolant onto or above said ocean surface.

3. A method according to claim 2 in which said coolant is artificial snow.

4. A method for reducing the wind force of a tropical cyclone that is moving over water in a discernible path, said method comprising operating in the vicinity of the eye of said cyclone a plurality of mechanisms each of which is operable to reduce the heat that is available to said cyclone, and operating said mechanisms substantially simultaneously and without interruption while moving said mechanisms substantially in said path.

5. A method according to claim 4 wherein said mechanisms include a plurality of artificial snow making devices, said method comprises operating said devices simultaneously substantially continually and without interruption, and projecting the simultaneous outputs of said devices over said water substantially continually and without interruption during motion of said mechanisms over said water in said path.

6. A method of suppressing the wind-induced heat exchange of a tropical cyclone that is moving in a discernible path over an ocean region, from which region moisture is rising, said method comprising providing at least one floating navigable vessel operable for moving over said ocean, and arming said vessel with multiple coolant making devices, said method further comprising controlling said devices to operate in concert and orienting said devices to project said coolant away from said vessel onto or above the surface of said ocean, and operating said vessel to move on said surface in said path while simultaneously controlling said devices to produce a substantially uninterrupted stream of said coolant.

7. A method according to claim 6 employing artificial snow as coolant.

* * * * *